Sept. 28, 1971    E. SOWINSKI    3,608,378

PRESSURE RESPONSIVE INSTRUMENT

Filed Nov. 18, 1969

INVENTOR
EDWARD SOWINSKI

BY Jerome Bauer

ATTORNEY

United States Patent Office 3,608,378
Patented Sept. 28, 1971

3,608,378
PRESSURE RESPONSIVE INSTRUMENT
Edward Sowinski, c/o Instrument Craftsmen Corp.,
41 Merritt Road, Farmingdale, N.Y. 11735
Filed Nov. 18, 1969, Ser. No. 877,683
Int. Cl. G01l 7/14, 19/04
U.S. Cl. 73—393       4 Claims

ABSTRACT OF THE DISCLOSURE

An instrument responsive to ambient pressure changes in which a visual indication, such as a pointer, is urged through standardized rotational traverses for a particular pressure change, even though that pressure change might cause varying linear movements in a sensing diaphragm or bellows being used to operate the pointer. Included in the drive between the bellows and pointer is a rotatable driven member having a least a portion thereof which converts, as a function of its mounting, each linear movement input, even though of a varying nature, into rotational traverses of the same extent. Thus, the instrument is calibrated to the peculiarities in the expansion and contraction performance of the bellows.

---

The present invention relates generally to improvements in instruments responsive to ambient pressure changes, and more particularly to an improved barometer, altimeter, or similar instrument operated by a pressure-sensing diaphragm or bellows which is readily calibrated to provide accurate readings despite anomalies in the expansion and contraction performance of the bellows.

The theory of operation of most altimeters or other such instruments involves the sensing of ambient pressure changes by a diaphragm or bellows, such pressure changes as do occur being manifested as output linear movements from the bellows. These linear movements are used to power the instrument pointer or signalling element in rotational traverses relative to a dial face.

The difference in ambient pressure for any selected altitude change, say of 1000 feet, is a constant and accordingly should be reflected by a standardized rotational traverse of the pointer throughout the altitude range of the altimeter. However, each model or type of bellows appropriate for use in an altimeter does not produce a constant linear movement output for a given pressure change throughout its range of expansion and contraction. During initial expansion, the linear movement of the bellows might be greater than that produced in a more advanced condition of expansion for the same pressure change. This deficiency or anomalous performance of the bellows is often ignored although it is known to adversely affect the accuracy of the instrument.

Broadly, it is an object of the present invention to provide a corrected or calibrated altimeter or other pressure responsive instrument overcoming the foregoing and other short-comings of the prior art. Specifically, it is an object to provide an ambient pressure responsive instrument having movement-compensating means readily, and in a simple manner, embodied in the drive connection between the bellows and the pointer to thereby convert linear movements, even of a varying nature, into standardized rotational traverses.

An altimeter or similar instrument demonstrating objects and advantages of the present invention is operated by bellows-produced linear movements which, in turn, are used to peripherally drive an eccentric of an output shaft through rotation. The extent of eccentricity of the eccentric is selected to vary in accordance with the variation in the linear movements due to anomalies in the performance of the bellows. In this way, these anomalies are cancelled out and the instrument is capable of accurate performance.

The above brief description, as well as further objects and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
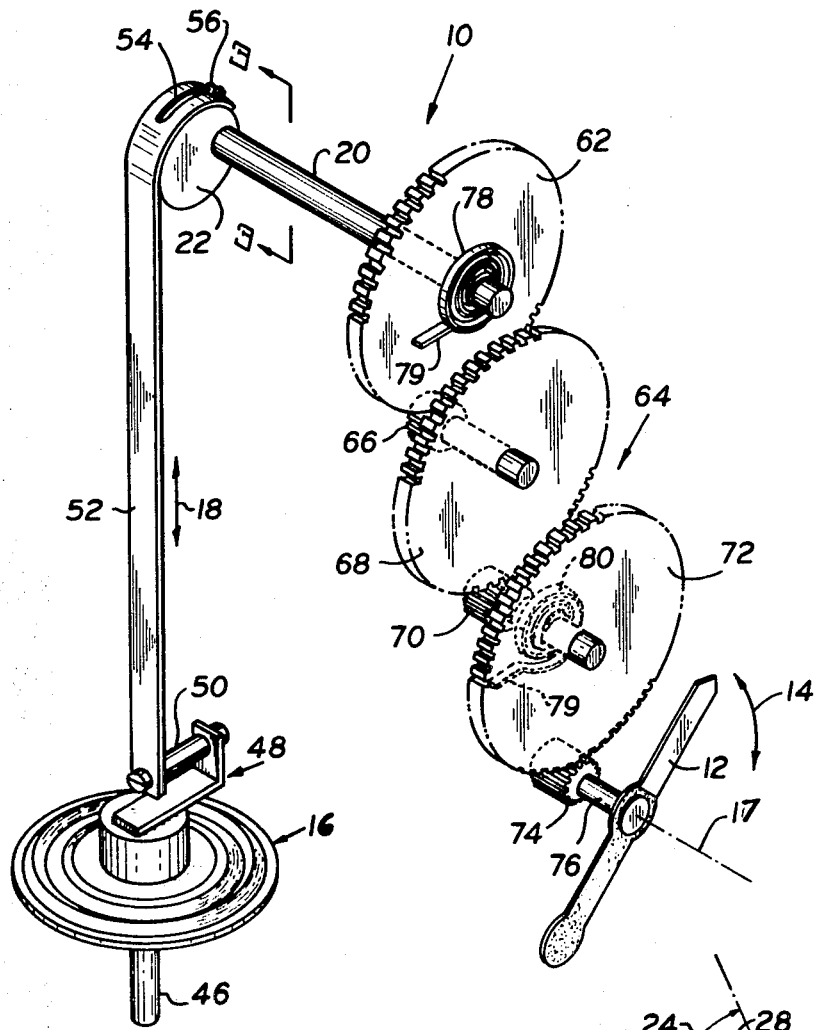
FIG. 1 is a perspective view of a pressure responsive instrument according to the present invention.

Reference is now made to the drawings wherein there is shown the major internal components, generally designated 10, of an ambient pressure responsive instrument demonstrating objects and advantages of the present invention. Such pressure responsive instrument could be, for example, a barometer, an altimeter, which instrument it will be assumed to be for purposes of this description, or a like instrument or device. In the case of an altimeter, as generally understood, such instrument includes a pointer 12 or the like which rotates in front of a dial face (not shown) on which there is a circumferential arrangement of altitude designations. As is further well understood, the altimeter 10 is effective in translating ambient pressure changes, which are experienced when an aircraft changes its altitude, into corresponding altitude indications of the dial face. Specifically, the change from one altitude to another altitude which, in turn, is a change from one known ambient pressure to another ambient pressure, is manifested by a rotational traverse 14 of the pointer 12 about its rotational axis 17 to correspondingly reflect the movement of the aircraft from the starting altitude to the changed altitude. The theory of operation of most altimeters, of which the altimeter 10 is to be understood to be exemplary of, is one in which ambient pressure changes are sensed by linear movements in a diaphragm or bellows means 18 which will be understood to be any one of many commercially available models and types. These linear movements, designated 18 in FIG. 1, of the bellows means 16 are converted, in a manner which will subsequently be explained, into rotational movement which is transmitted to pointer 12.

Inasmuch as the differences in ambient pressure for any selected altitude change is constant, that is an altitude change of say 1000 feet from any starting altitude to any terminating altitude is a constant, it is of course desirable that each rotational traverse 14 that is required of the pointer 12 in reflecting a 1000 foot altitude change also be constant. Further, it is also desirable, although not possible to achieve, for each of the linear movements 18 in the bellows means 16 which occur as a result of each altitude change, again using the reference figure of 1000 feet as in the previous example, to also be constant and uniform. In other words, it is desirable that there be standardized and similar extents of linear movements 18 used as inputs to the mechanism of the instrument 10 which convert these linear movements into standardized and similar extents of rotational traverses 14 in the pointer 12. Unfortunately, however, a bellows means 16 is not known to be commercially available which will produce, throughout the range of altitude indication which is commercially required, a standardized extent of linear movement for any selected reference altitude change. This deficiency in performance of all commercially known bellows means 16 is attributable to many causes, including but not necessarily limited to inaccuracies of manufacture, frictional forces in both the bellows means and also in the moving parts of the instrument, and other like reasons. As a consequence, during initial expansion, or contraction as the case may be, of the bellows means 16, the ambient pressure change which reflects the reference 1000 foot altitude change may manifest itself in a shorter linear movement in the bellows means 16 than that which occurs for the same reference altitude change when the bellows means 16 is in a more advanced condition of expansion. Because of this deficiency in the operation of the ambient pressure change sensing portion of the instrument 10 or, more particularly, the bellows means 16, it is necessary that it be calibrated to the variation in the linear movements 18 of the particular bellows means that is utilized in powering the pointer 12. It is contemplated that this variation in linear movements 18 will be charted throughout the range of operation of the bellows means 16 in a manner consistent with well understood calibration techniques and procedures.

Figure 3:
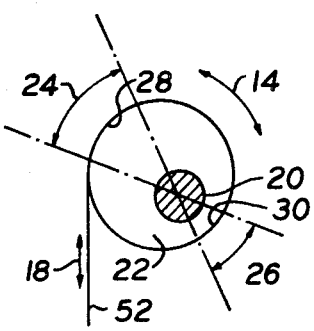
FIG. 3 is a simplified elevational view, in section taken on line 3—3 of FIG. 1, illustrating the calibration function embodied in the instrument.

Before actual description of the construction of the instrument 10, it is believed helpful to explain the compensating function embodied in the instrument 10 by which linear movements 18 of unequal varying extents are nevertheless converted into standardized rotational traverses 14 for the same reference ambient pressure change. This compensation function is perhaps best illustrated in FIG. 3 in conjunction with FIG. 1, wherein it will be understood that the input linear movements 18 are transmitted so as to produce rotation 14 in an output shaft 20, the rotation of which shaft is used to power the pointer 12 through rotational traverses 14. More particularly, mounted in an interposed position between the element transmitting the linear movements 18 and the output shaft 20 is a member 22 driven in rotation by each linear movement 18. Specifically, as clearly shown in FIG. 3, driven member 22 is mounted in an eccentric relation to the rotational axis of the output shaft 20 and, also important to note, is driven at its periphery in rotation about the rotational axis of the output shaft 20. As a consequence of the peripheral drive and of the eccentricity just described, a linear movement 18 input which is longer than a preceding or succeeding linear movement, because of bellows manufacturing variances and other reasons previously mentioned, is nevertheless caused to produce an output rotational traverse of the same extent which is produced by a lesser linear movement. That is, as clearly illustrated in FIG. 3, a linear movement of comparatively large extent, designated 24, will produce a rotational traverse 14 which is the same as the rotational traverse produced by the linear movement of a lesser extent 26, all as is clearly diagramatically illustrated in FIG. 3. This follows from the fact that linear movement 24 is transmitted to the peripheral surface 28 of driven member 22 at a location of greater eccentricity from the rotational axis of the output shaft 20 than the peripheral surface 30 to which is applied the shorter linear movement 26.

Thus, based on the inherent variations in expansion and contraction performance of the selected bellow means 16, it is possible to correspondingly select an interposed driven member 22 of the proper peripheral surface contour or shape which, when appropriately eccentrically mounted about the rotational axis of the output shaft 20, has the necessary extent of eccentricity at different rotational positions to compensate for the variation in the shaft-powering linear movements of the bellows means 16.

Figure 2:
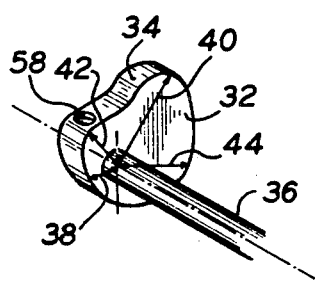
FIG. 2 illustrates an alternate embodiment of one of the parts of the instrument of FIG. 1.

In FIG. 2 another embodiment of a driven member is illustrated and designated 32. In this embodiment, surface segments or portions of the peripheral surface 34 are located at varying extents from the rotational axis 36, starting from a close location at a distance 38 to a comparatively large distance 40. Further, embodiment 32 illustrates how two intermediate distances 42 and 44 can be included so as to provide whatever calibration to the peculiarities in the operation of the bellows means 16 that is necessary.

Turning now to a preferred construction of the instrument 10 as illustrated in FIG. 1, the same includes a post 46 depending from the bellows means 16. Although not shown, post 46 will be understood to be operatively associated with vertically adjusting means effective to hold the post 46 in a desired vertically adjusted position. This facilitates calibration of the instrument 10 since adjusting movements in the post 46 are transmitted to the pointer 12 thereby permitting the pointer 12 to be set at ground zero or other such reference value prior to operation of the instrument 10 during actual flight. Extending from the opposite side of the diaphram or bellows means 16 is a bracket 48 mounting a bi-metal pin 50 which expands and contracts in response to ambient temperature changes, in much the same way that a thermostat operates. Pin 50 is therefore effective in compensating for the expansion and contraction, due to temperature, of the drive connection of the instrument 10 which extends between the pin 50 and the driven member 22. More particularly, this drive connection is achieved by an elongated driving member 52, preferably a metal ribbon or strap, which accommodates the pin 50 in an opening at its lower end and, at its upper end, has a slot 54 through which a screw 56 is disposed in threaded engagement with a threaded bore in the driven member 22. See, for example, the threaded bore 58 of the driven member embodiment 42 of FIG. 2. The longitudinal dimension of the slot 54 permits relative adjustment between the driving and driven members 52 and 22, respectively, which also assists in facilitating the calibration of the instrument 10.

Driven member 22, as clearly illustrated in FIG. 1, is eccentrically mounted, for reasons already discussed, on the output shaft 20 which, although not shown, will be understood to be appropriately journaled for rotation in bearings and the like. In the preferred embodiment illustrated, output shaft 20 has fixedly mounted thereon a pinion gear 62 of a gear train, generally designated 64, through which the rotational output of the shaft is transmitted to the pointer 12. Specifically, gear train 64 includes, in addition to gear 62, the meshing gears 66, 68, 70, 72 and 74, the last named gear of which has a shaft 76 mounting the pointer 12. Light helical springs 78 and 80, each connected at one end to a gear train shaft and at its other end to a pin 79 mounted on the pinion gear, are included in the gear train 64 to remove backlash and play between the meshing gears.

From the foregoing it should be readily appreciated that the pressure responsive instrument 10, serving for example as an altimeter, is readily adapted to provide a visual indication of altitude changes corresponding to ambient pressure changes. In its mode of operation, the bellows means 16, although producing a variation in linear movements 18, nevertheless produces standardized rotational traverses in the output shaft 20 which is transmitted to the pointer 12. The conversion of varying linear movements 18 into standardized rotational traverses 14 is achieved by paying out the driving member 52 to the eccentrically mounted driven member 22 on which the lengths of the driving member produced by each linear movement in the bellows means 16 is taken up in a supported wrapped relation about the driven member 22. By proper selection of a contoured driven member 22 the instrument 10 is readily calibrated to the specific manufacturing characteristics of the bellows means 16 as well as to the frictional forces and other operating parameters of the drive connection between the bellows 16 and the pointer 12.

A latitude of modification, change and substitution is intended in the foregoing disclosure and in some instances some features of the invention will be employed without a corresponding use of other features.

What is claimed is:

1. A pressure responsive device comprising a bellows means adapted to partake of linear expansion and contraction movements reflecting the prevailing presssure, a rotative output shaft operatively arranged to be powered in rotational traverses by said linear movements incident to producing visual indications of said prevailing pressure, an elongated driving member drivingly connected between said bellows means and said output shaft to aid in converting said linear movements into said rotational traverses, an eccentric mounted on said output shaft having an operative connection to said driving member so as to affect the rotational traverses of said output shaft as produced by said linear movement inputs from said bellows means and connecting means for adjustably connecting the opposite ends of said driving member to said bellows means and said eccentric to thereby facilitate the calibration of said device.

2. A device as defined in claim 1 including a dial face having indicia circumferentially spaced thereabout effective to provide visual indications of said presssure and a pointer mounted for rotation relative to said dial face operatively arranged to be powered in rotational traverses by said output shaft.

3. A device as defined in claim 2 including a gear train interposed between said output shaft and said pointer effective to amplify said resulting rotational traverses.

4. A device as defined in claim 3 including a bimetal temperature responsive means in said driving connection between said bellow means and said output shaft effective to calibrate said device to the prevailing ambient temperature.

References Cited

UNITED STATES PATENTS

| | | | |
|---|---|---|---|
| 1,377,032 | 5/1921 | Starling et al. | 73—387 |
| 2,388,027 | 10/1945 | Weil | 73—387 |
| 3,040,582 | 6/1962 | Lorenz | 73—386 |
| 3,302,461 | 2/1967 | Angus | 73—386 |

LOUIS R. PRINCE, Primary Examiner

D. M. YASICH, Assistant Examiner

U.S. Cl. X.R.

73—386, 410